July 2, 1935.  W. W. HARTMAN  2,006,550
SYNCHRONOUS SLICER AND WRAPPER FEED
Filed June 15, 1931  2 Sheets-Sheet 1

Inventor
William Walter Hartman

Attorney.

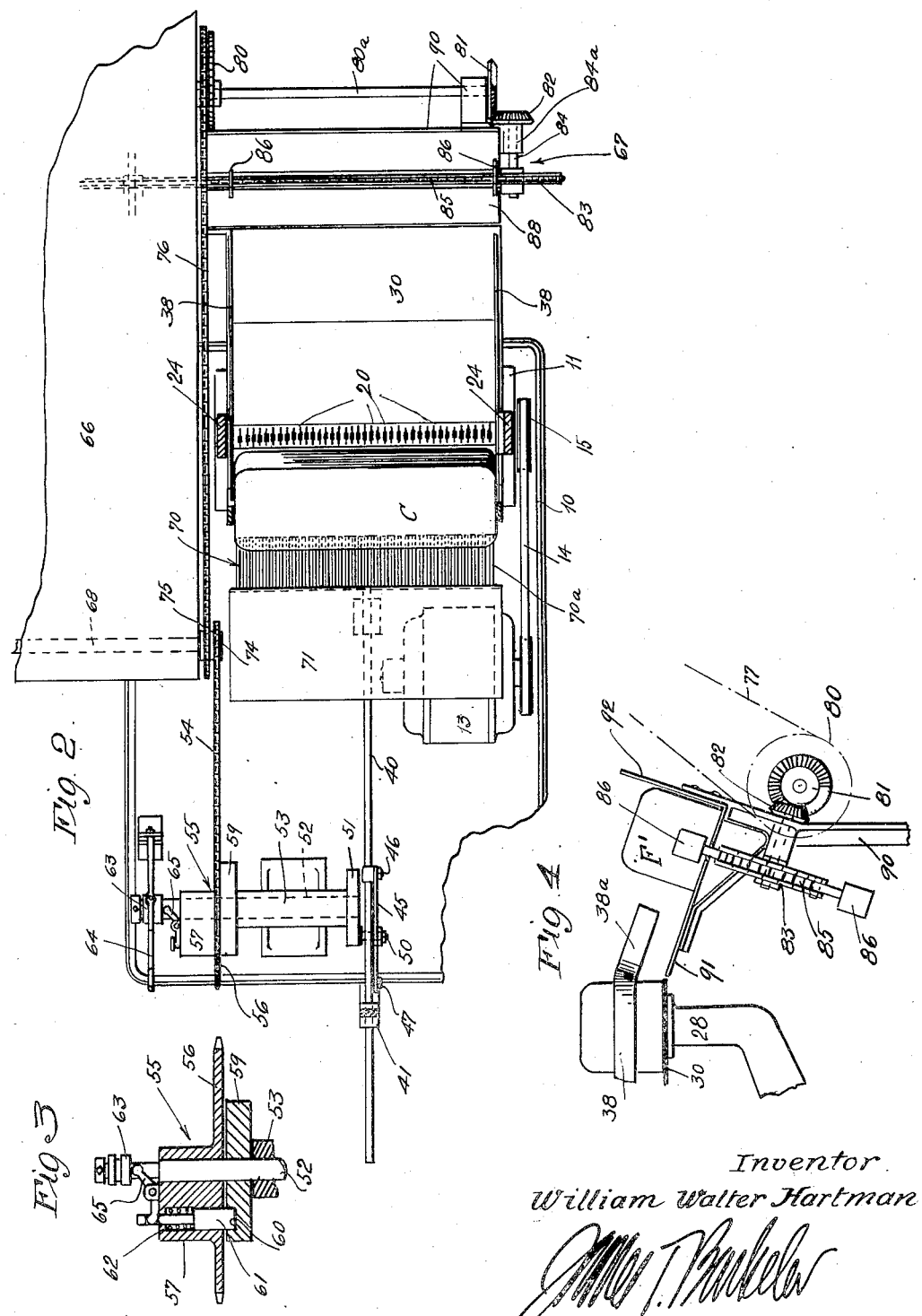

Patented July 2, 1935

2,006,550

UNITED STATES PATENT OFFICE 2,006,550

SYNCHRONOUS SLICER AND WRAPPER FEED

William Walter Hartman, Los Angeles, Calif.

Application June 15, 1931, Serial No. 544,429

2 Claims. (Cl. 146—153)

This invention relates generally to bread slicing and bread wrapping machines, and more particularly to such combinations or interconnections between them as result in saving floor space and labor and in giving other good operating characteristics to combined slicing and wrapping machines as are desired by practical bakers who use the same.

It is an object of my invention to feed loaves of bread to and through a bread slicing means and to a conveyor of a bread wrapping machine in timed relation with said conveyor. To obtain the most efficient operation of a slicer and a wrapper the two machines should run at the same rate. This timing of the machines eliminates any piling up of bread ahead of the slicer or between the slicer and wrapper and yet insures a supply adequate to keep the wrapper running at maximum capacity. The wrapper is normally the slower machine and for this reason is used as a basis for determining the rate of handling the loaves and for synchronizing the feed means.

In the interests of economy of operation, the loaf should be carried from the slicer to the wrapper without any intermediate handling operation. When used in conjunction with wrappers adapted to wrap a loaf without a cardboard tray, the loaf may be carried directly to the wrapper mechanism and I desire to provide such a feed means, and one that will hold the sliced loaf together and carry it as a unit.

Another object of my invention is to provide a loaf conveyor or feeding mechanism comprising a single reciprocating ram having the threefold purpose, first, of feeding the unsliced loaves of bread through the rapidly and continuously reciprocating slicing knives of the bread slicer, then, second, feeding the sliced loaves a short distance into the clear beyond said knives, and then, third, feeding the sliced loaves onto a wrapper conveyor mechanism that is driven synchronously with the ram to receive the sliced loaves therefrom successively. It will be apparent that by this invention I provide a very simple, dependable and compact construction, which, amongst other advantages, has the important quality or advantage of economizing substantially in floor space. This feature is very helpful because the bakeries where new machinery of this sort is installed, were not originally laid out with relation to the possibility of making subsequent installations of such new machinery, and consequently in many plants the floor space is cramped, or otherwise somewhat inadequate, and consequently the substantial saving in floor space accomplished by my invention herein set forth obviously is very helpful and useful in practice.

Another object of my invention is to include as part of the means that synchronously drives the slicer and wrapper, a clutch that has provision for selective engagement of the bread slicer, by means of which some useful advantages are derived, as will hereinafter be more particularly described.

Other objects, advantages and purposes of this invention will become apparent by consideration of the accompanying drawings, also of the following description, and of the appended claims.

In the accompanying drawings, and in the following description, like parts are represented by like reference numerals.

In the drawings:

Fig. 2 is a plan section on line 2—2 of Fig. 1;

Fig. 3 is a horizontal medial section of the clutch driving the reciprocating arm;

Fig. 4 is an elevation showing a variational position of wrapper intake conveyor.

Figure 1:
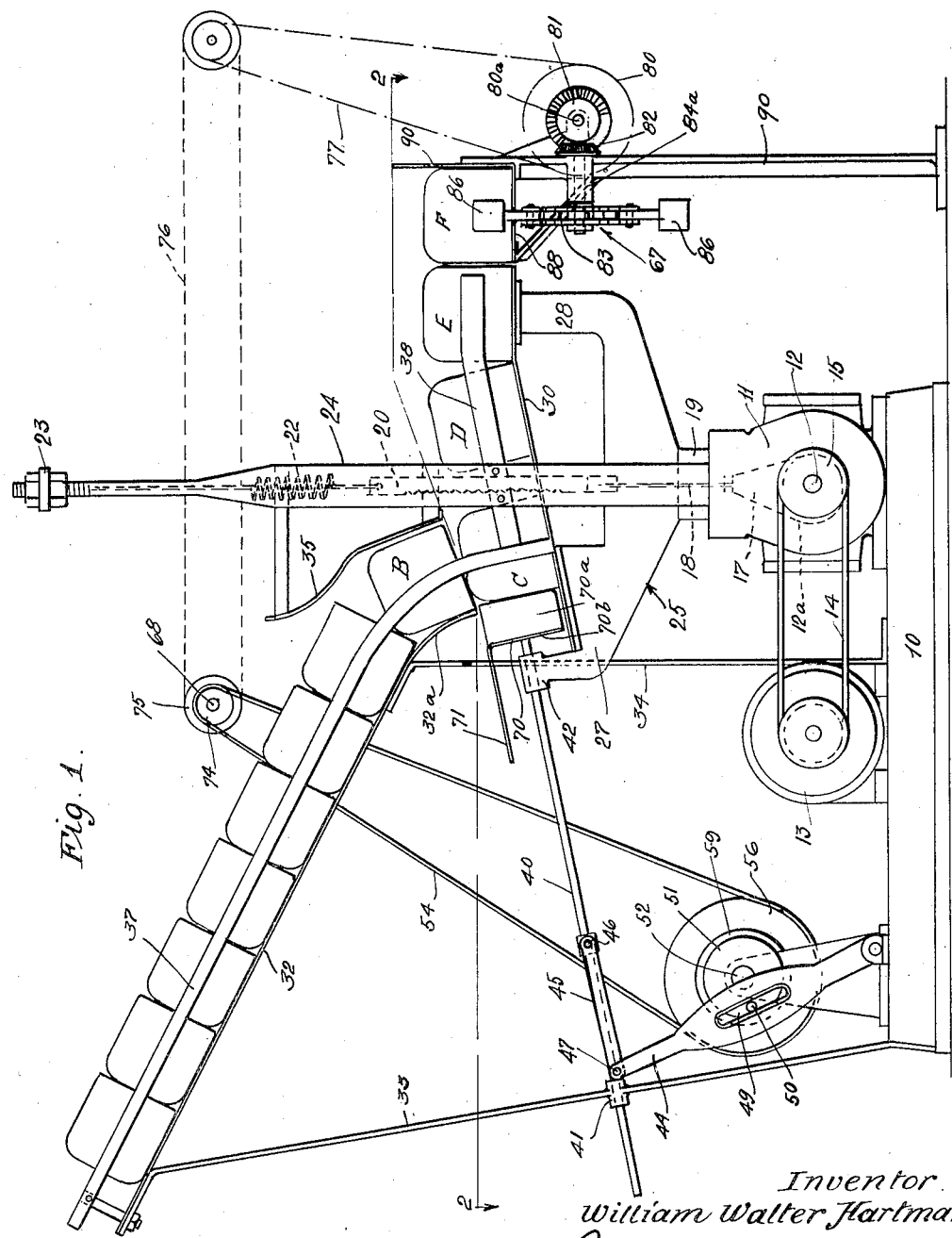
Fig. 1 is a side elevation of slicer and wrapper mechanisms, equipped with a feeder in accord with my invention.

Referring especially to Fig. 1, the slicing and feeding mechanism is mounted on base 10. Upon this base is a crankcase 11 within which is journaled eccentric shaft 12. Power to drive the eccentric shaft is transmitted from motor 13 by belt 14 to pulley 15 secured to an externally projecting end of shaft 12. Attached to the eccentrics 12a on the eccentric shaft by connecting rods 17 and push rods 18, which latter have a bearing in block 19 on top of the crankcase, is a series of horizontally spaced, vertically reciprocable bread cutting knives 20 disposed in the path of the loaves of bread. Knives 20 are attached at their upper ends to springs 22 suspended from cross bar 23 supported by and between uprights 24. The springs, continually tending to move the knives upward, keep the knives under tension at all times to insure a smooth, straight cut of the bread.

The vertically reciprocating knives and drive means described are one of my preferred forms of slicer, though it will be understood that any suitable form of slicer may be used. Therefore, it is considered that for the present application, this brief description of the slicer is sufficient, reference being had to my copending application Ser. No. 429,050 filed February 17, 1930 for details of the construction of the cutters and crankcase.

On top of bearing block 19 and attached thereto, is a bracket generally indicated at 25 which has front and rear arms, 27 and 28 respectively, that carry base plate 30 along which the loaves are moved as they pass through the rapidly and continuously reciprocating bread slicing knives 20. Plate 30 is made in two parts to permit the passage of knives 20 through it, and the adjoining ends of the plate halves are supported by uprights 24. However, the plate is considered and herein referred to as a single unit.

The unsliced loaves are placed on a gravity chute plate 32 carried at its ends by supports 33 and 34 rising from base 10. The lower end of chute 32 is curved at 32a to drop the loaves onto plate 30 in the position C just ahead of the cutters. A guide shoe 35 carried on uprights 24 prevents the loaves from sliding into the knives before dropping onto plate 30. End rails or guides 37 and 38 are suitably attached to plates 32 and 30 and the supporting structure to prevent endwise displacement of the loaves and to hold the slices together.

The actuating means for feeding the loaves through the knives is the reciprocating ram 40 slidably mounted in bearings 41 and 42 so positioned on members 33 and 27 respectively that ram 40 moves substantially parallel to plate 30. On the forward end of ram 40 is pusher 70 adapted to press against one side of the loaf C to push it past the knives 20 to the position D. Pusher 70 is made up of a series of horizontally spaced fingers or plates 70a, the several plates being adapted to move forwardly between the spaced knives 20. The pusher plates 70a are mounted at their rear edges on a head plate 70b and the forward end of the ram 40. Also mounted on the forward end of ram 40 is apron 71 which forms, as shown, a rearwardly bent extension of head plate 70b. Apron 71 is slightly less than the width of plate 30 and parallel thereto. Thus when ram 40 advances, the apron moves under the loaf at B to keep it in position until the time for it to move to C after the retraction of ram 40.

Ram 40 is reciprocated by oscillating arm 44 to which it is connected through link 45 pivoted to ram 40 at 46 and to arm 44 at 47. Arm 44 is pivoted at its lower end to base 10, and is slotted at 49 to receive crank pin 50 on disk 51 at one end of shaft 52 as shown in Figs. 1 and 2. Shaft 52 is journalled in pedestal bearing 53.

Shaft 52 is driven by chain 54 and sprocket wheel 56, the sprocket being connected to shaft 52 through a clutch generally indicated at 55 and shown in Figs. 2 and 3. For reasons that will appear later, it is desired to use a clutch having only a single point of engagement so that when the parts are in operative engagement they will always have the same relationship. It will be realized that any other suitable type of clutch may be used, the one illustrated being typical. The drive chain 54 passes over sprocket 56 having a large hub 57 loosely mounted on shaft 52 to turn thereon. Adjacent to the face of sprocket 56 is clutch disk 59 keyed to shaft 52 and having a single recess 60 adapted to receive plunger 61, carried in hub 57, to drivingly lock the clutch disk and sprocket together. The plunger is kept normally in engaged position by means of compression spring 62 but may be disengaged by sliding collar 63, operated by handle 64, along shaft 52 to depress lever 65 and so retract plunger 61.

The wrapping machine is here illustrated diagrammatically at 66 because this form of wrapper is well known in the art, but my invention may be adapted to other types of wrappers. In such machines the intake conveyer generally designated at 67 for feeding the sliced loaves to the wrapping elements, is timed to operate in synchronism with other parts of the wrapper. Typically this is done by providing a main power shaft connected to a prime mover and driving all moving parts from that shaft with suitable chain or gear connections. Such a main power shaft is indicated at 68 and mounted thereon is sprocket 74, over which chain 54 passes to drive reciprocating arm 40 as above described, and sprocket 75 from which the wrapper intake conveyer 67 is driven as will be set forth. The internal wrapping mechanism is also driven from shaft 68.

Through the medium of chains 76 and 77, sprocket 75 drives sprocket 80 on one end of shaft 80a which has on its other end bevel gear 81. Gear 81 meshes with bevel gear 82 mounted on the shaft 84, journalled in bearing 84a, to drive sprocket 83 over which the conveyer chain 85 runs. Pushers 86 are mounted on chain 85 in pairs spaced apart the length of the loaves and push the loaves along the slotted conveyer plate 88 into wrapper 66, the line of movement being transverse to the direction from which the loaves are moved onto plate 88. This conveyer mechanism and drive means are all a part of the wrapper and the bearing 84a and plate 88 are shown here as carried on bracket 90 which is a portion of the wrapper.

The infeed conveyer may be adapted to operate intermittently by some suitable form of intermittent or mutilated gearing; a simple form here illustrated comprises gear 81 which engages gear 82 for about three-fourths of a revolution. Hence, there is a period when the pushers are at rest and a sliced loaf can be inserted in the space between two of them, which thus support the loaf at each end to keep the slices together. The loaf can then be moved as a unit into the wrapper to a position from which it is carried past the wrapping elements.

My invention may also be used with continuously moving intake mechanisms in which special provisions have been made to intermittently receive sliced loaves. Such special provisions are described in detail in my copending application Ser. No. 550,199 filed July 11, 1931.

When in operation, the unsliced loaves are placed on the upper end of chute 32 and are fed by gravity onto plate 30. A loaf in the position C is then moved by ram 40 along plate 30 through the knives to the position D. Plate 30 is preferably inclined upward in the direction of motion so that a lower corner of the loaf is first presented to the knives whereby a better and faster cut is obtained. In the position D, the sliced loaf is held endwise between rails 38 between which the loaf fits snugly to keep it together and prevent its sliding back into the knives; although the fit should not be too tight since loaves vary slightly in size.

The loaf is next moved to E and then to F where it is against stop 90 and between a pair of pushers 86. Each time the loaf is advanced, it is moved by a forward stroke of ram 40 though one or more loaves may be between the given loaf and the ram. The ram thus moves a given loaf through the knives and between pushers 86 by direct contact and by contact with the succeeding loaves, all such loaves being moved simultaneously.

Since the ram 40 and chain 85 are both driven in a definite speed relation to the main power shaft 68, the two moving elements are so timed that the loaves will be delivered into the path of the pushers at such times as they are temporarily stationary. It thus becomes apparent that the clutch means permitting disengagement of ram 40 should always re-engage at precisely the correct point in order to maintain the synchronized relation between the ram and the wrapper infeed.

Fig. 4 shows a variational form of intake conveyor. In this case plate 91 and stop 92 have been tilted to form a trough into which the loaf slides by gravity. Rails 38 are bent away from the loaf at their tips 38a to permit the loaf to slide freely down incline 91 into position F'. Ram 40 is so timed that the loaf is moved from E onto the incline 91 at the proper time to allow it to slide between the stationary pushers 86.

In summarizing the previously described construction and operation of my invention, it is apparent that after the loaves are fed through the rapidly reciprocating knives 20 they pass upon a relatively short base plate and end guide mechanism indicated by reference numerals 30 and 38 in Fig. 1, it being obvious that this mechanism demarks a path along which the sliced loaves of bread are successively conveyed away from the knives in order to get the loaves slightly clear of the knives. Adjacent the delivery end of this base plate and end guide mechanism, 30 and 38, respectively, is located the wrapper conveyor mechanism, which in different applications may take widely different forms, but in the application shown in Fig. 1 this wrapper conveyor mechanism consists essentially of the platform 88 and the loaf end supports 86. In this application the platform 88 happens to be stationary, and the loaf end supports 86 are susceptible of motion to convey away the sliced loaves of bread, but the relationship of these parts may be other than that just indicated. From the previous detailed description, and from the drawings, it is apparent that at certain phases of the conveying action, namely, when the pushers or loaf end supports 86 are approximately in line with the end guides 38, then it may be said that at approximately these phases of the parts the wrapper conveyor mechanism comprises substantially a direct continuation of the loaf path demarked by the base plate and end guide mechanism 30 and 38, so that when the parts are in this phase the wrapper conveyor mechanism is in position to successively receive the sliced loaves of bread from the delivery end of the base plate and end guide mechanism. The parts are intentionally brought into this relationship so that the ram 40, which includes pusher 70 and the projecting fingers 70a, can accomplish its combined threefold purpose during its forward stroke, of feeding the bread first through the slicing knives 20, then, second, along the aforesaid path demarked by the base plate and end guide mechanism to bring the sliced loaves slightly away from the knives, and then, third, onto the wrapper conveyor mechanism comprising platform 88 and loaf end supports 86, when this wrapper conveyor mechanism is in proper phase as aforesaid to receive the sliced loaves from the base plate and end guide mechanism 30 and 38. By arranging the various parts so that the ram can achieve the threefold purpose just described, a substantial amount of floor space is saved for bakeries desiring such installation, especially when compared with extended belt or flight conveyors, which previous to this invention were the only expedients used for automatically combining bread slicing and bread wrapping machines.

Furthermore, by inserting in the previously described means that synchronously drives the wrapper conveyor mechanism and the ram 40, a selective clutch mechanism, one form of which is illustrated in Fig. 3, it is possible to stop the feeding action of ram 40 without stopping the wrapper conveyor mechanism or any other of the wrapper parts. It is very desirable that the operator should be in position to do this, for if some part of the slicer should break, as, for instance, a knife, the slicer should be stopped immediately by disengagement of said clutch, but since ordinary bread wrappers usually perform their wrapping operations best at some normal wrapping speed, and also for other reasons, it is preferable that the wrapper should be kept operating in order to fully wrap and clear all loaves of bread within the wrapper system, notwithstanding that the feeding of loaves through the slicer to the wrapper has stopped, and all this can be nicely accomplished by the slicer driving clutch located as I have shown. But this clutch having the previously described provision for selective re-engagement of the parts, makes it possible for the operator to shift the clutch handle to re-engaging position, at any time he desires, and the selective character of the clutch will then automatically engage to drive the ram only in its proper synchronous relation with the wrapper conveyor mechanism, irrespective of the phase relation of the parts at the instant when the clutch is shifted to re-engaging position. Obviously, such a combination of parts as described in this paragraph affords the operator of the equipment quick and free control of the mechanism, such as the natural speed and character of his duties require, and this feature of my invention is found to materially contribute to the effective operation of the entire equipment.

In connection with the modification shown in Fig. 4 of my drawings, wherein obviously the stroke of the feeding ram is short enough to leave a sliced loaf on the platform 30 as shown, and yet long enough to have pushed the preceding loaf onto the inclined platform 91 of the wrapper conveyor mechanism, I desire to point out that this modification has the desirable advantage that the loaf thus passed onto the inclined platform 91 can slide forward and downward along same to position shown in Fig. 4, thereby freeing itself entirely from the next succeeding loaf, and consequently when the forward loaf is conveyed ahead by the wrapper conveyor mechanism it will experience no frictional drag against any succeeding loaf. Since these loaves are sliced, it is apparent that such frictional drag between successive loaves might tend to disarrange the slices if the loaves were in contact with each other, but by permitting one loaf to slide clear of the other, by means of the inclined platform 91, as illustrated in Fig. 4, this difficulty is avoided.

Though Fig. 1 shows the length of the base plate 30 and end guides 38 sufficient to hold two loaves of bread beyond the knives, it is apparent that this length can be made shorter or longer, according as it may be desired to move the wrapper conveyor mechanism, represented by reference numerals 88 and 86, closer to the slicer knives 20, or further from them. Even the arrangement shown in Fig. 1 shows a substantial saving in floor space for bakeries using the equipment, as compared with other modes of operation.

It will be understood the drawings and description are to be considered merely as illustrative of and not restrictive on the broader claims appended hereto, for various changes in design, structure and arrangement may be made without departing from the spirit and scope of said claims.

I claim:—

1. In a combined bread slicing and wrapping mechanism, the combination of a plurality of reciprocating bread slicer knives, base plate and end guide mechanism demarking a path along which the sliced loaves of bread are successively conveyed away from said reciprocating knives, wrapper conveyor mechanism including a platform and loaf end supports for successively receiving and conveying the sliced loaves from said base plate and end guide mechanism, said wrapper conveyor mechanism conveying said sliced loaves along a path that intersects at a substantial angle the said loaf path demarked by said base plate and end guide mechanism, loaf conveyor mechanism including a single reciprocating ram having fingers projecting from its forward end and adapted to pass between said slicing knives to convey the bread through and beyond said knives over the aforesaid path demarked by said base plate and end guide mechanism and onto said wrapper conveyor mechanism, means for synchronously driving said reciprocating ram and said wrapper conveyor mechanism in such relation to each other that said wrapper conveyor mechanism in the course of its action moves to such phase relation to said base plate and end guide mechanism as to enable the wrapper conveyor mechanism to receive a sliced loaf from the base plate and end guide mechanism while said ram is reciprocating forward to feed bread through said knives and onto said wrapper conveyor mechanism as aforesaid, and clutch mechanism in said synchronous drive means for disengaging and stopping said reciprocating ram without stopping said wrapper conveyor mechanism, the said clutch mechanism having provision for selective re-engagement to drive said ram only in the synchronous relation with the wrapper conveyor mechanism as aforesaid, irrespective of the phase relation of the parts at the instant when said clutch is shifted for re-engagement.

2. In a combined bread slicing and wrapping mechanism, the combination of a plurality of reciprocating bread slicer knives, base plate and end guide mechanism demarking a path along which loaves of bread are successively conveyed away from said reciprocating knives, wrapper conveyor mechanism including a platform and loaf end supports, said wrapper conveyor mechanism being located adjacent the delivery end of said base plate and end guide mechanism and in such relation thereto as to successively receive sliced loaves of bread therefrom, the said platform of said wrapper conveyor mechanism being inclined downwardly away from the base of said base plate and end guide mechanism so that sliced loaves of bread delivered to said inclined platform will slide downward along same into position between said loaf end supports of the wrapper conveyor mechanism, said wrapper conveyor mechanism being adapted to convey said sliced loaves along a path that intersects at a substantial angle the said loaf path demarked by said base plate and end guide mechanism, and a reciprocating ram having fingers projecting from its forward end and adapted to pass between said slicing knives to successively convey loaves through and beyond said knives, over the aforesaid path demarked by said base plate and end guide mechanism and onto said inclined platform of the wrapper conveyor mechanism, the length of stroke of said ram being sufficiently long to advance a sliced loaf onto said inclined platform of the wrapper conveyor mechanism, and yet sufficiently short so that said sliced loaf will slide forward on said inclined platform beyond the position to which said loaf was positively conveyed by action of said ram, so that when said sliced loaf is conveyed by the wrapper conveyor mechanism as aforesaid there will be no frictional drag between the last said loaf and any succeeding loaf.

WILLIAM WALTER HARTMAN.